Patented May 20, 1941

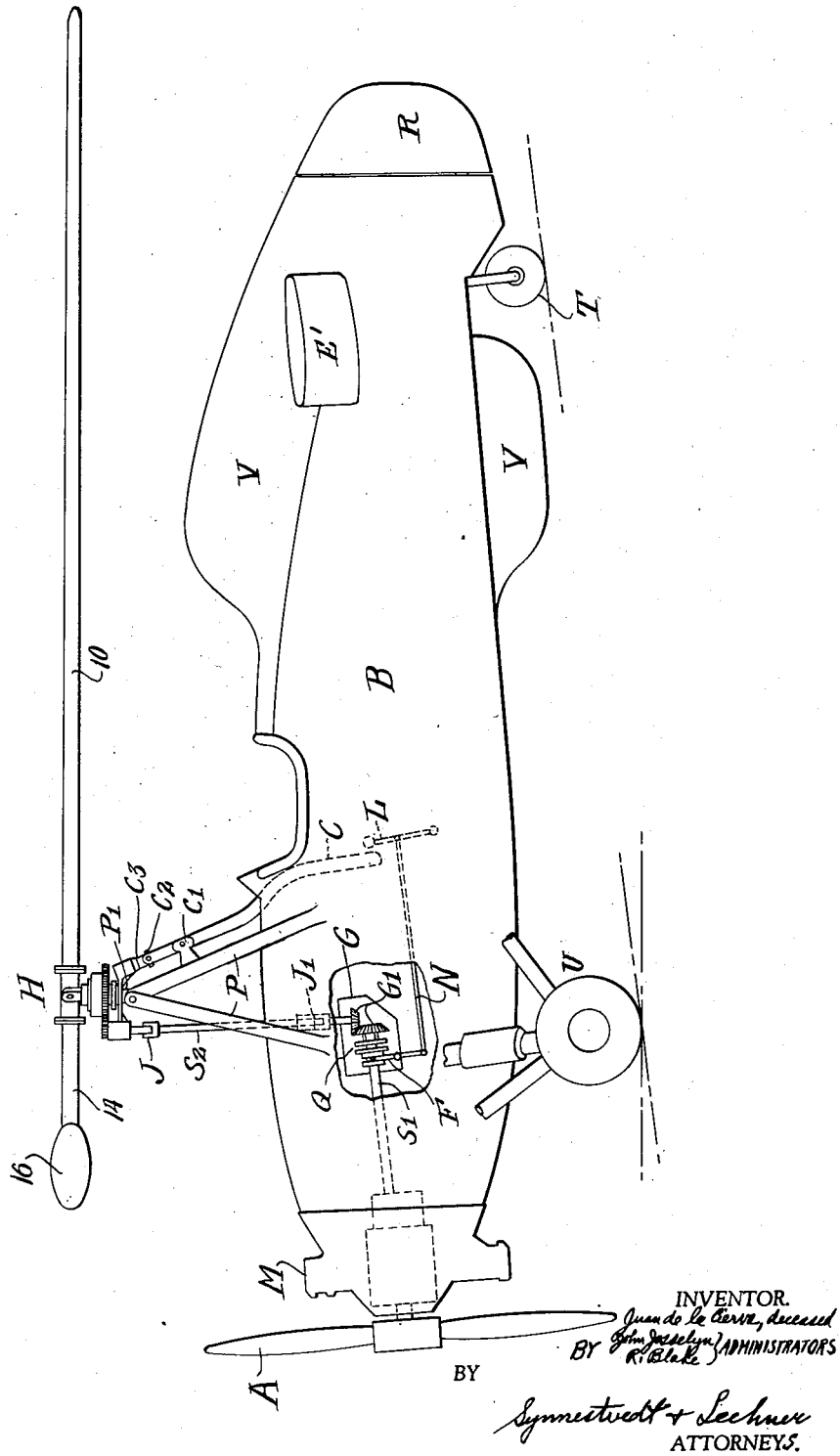

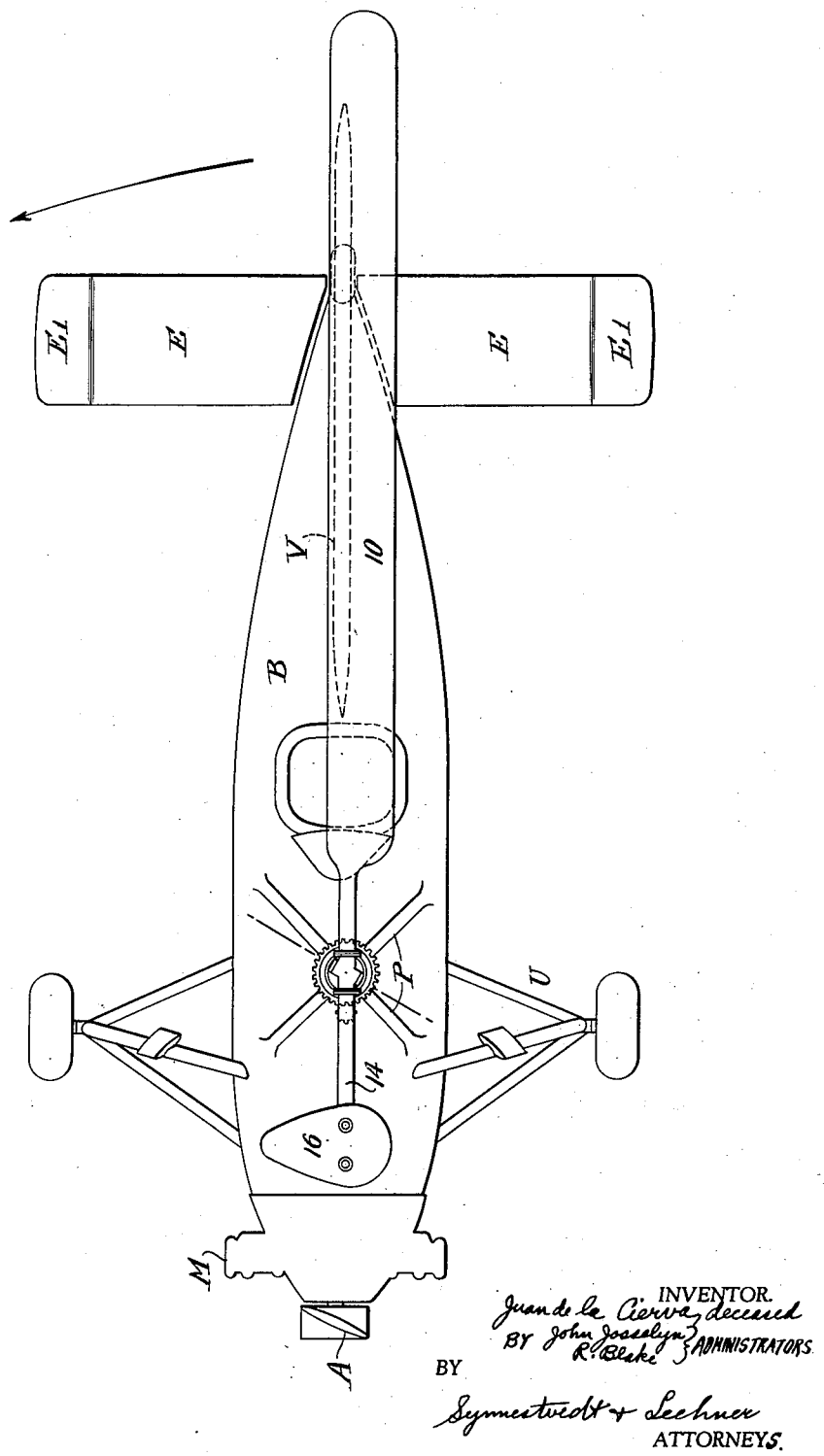

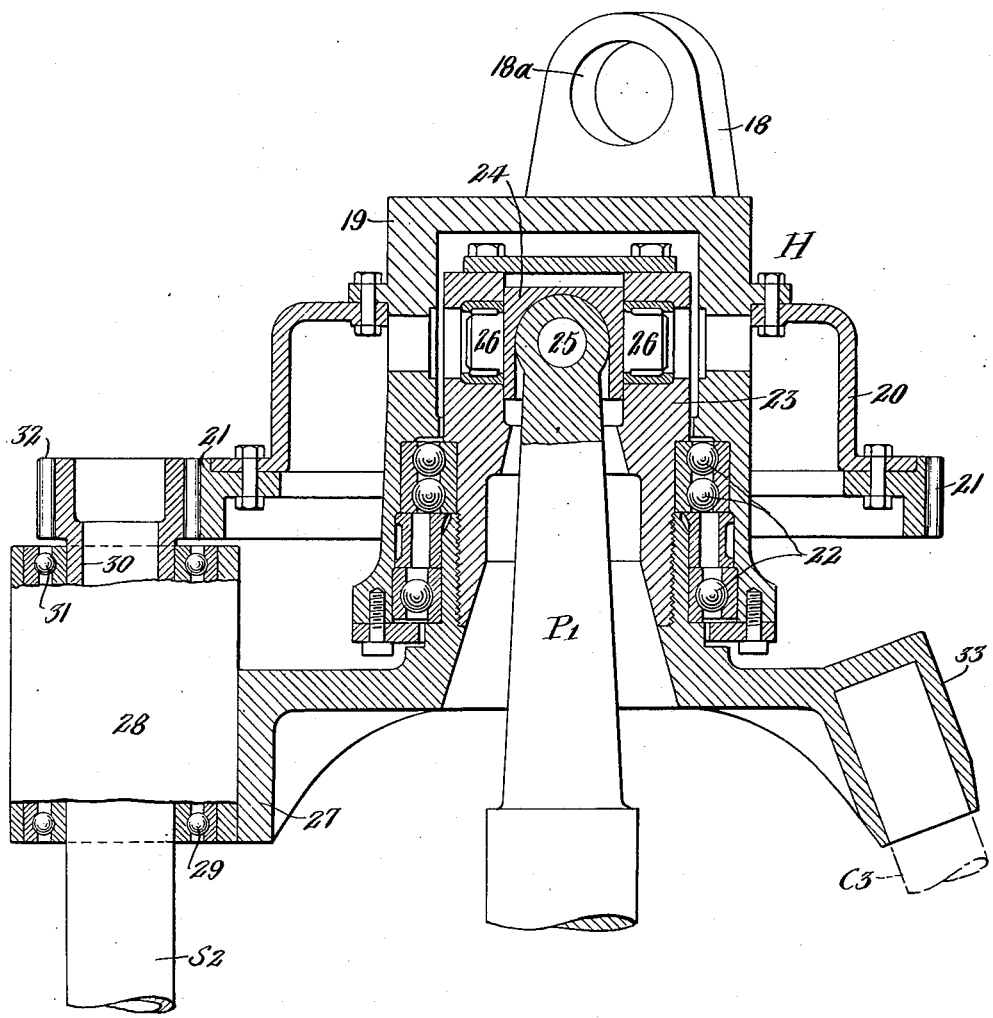

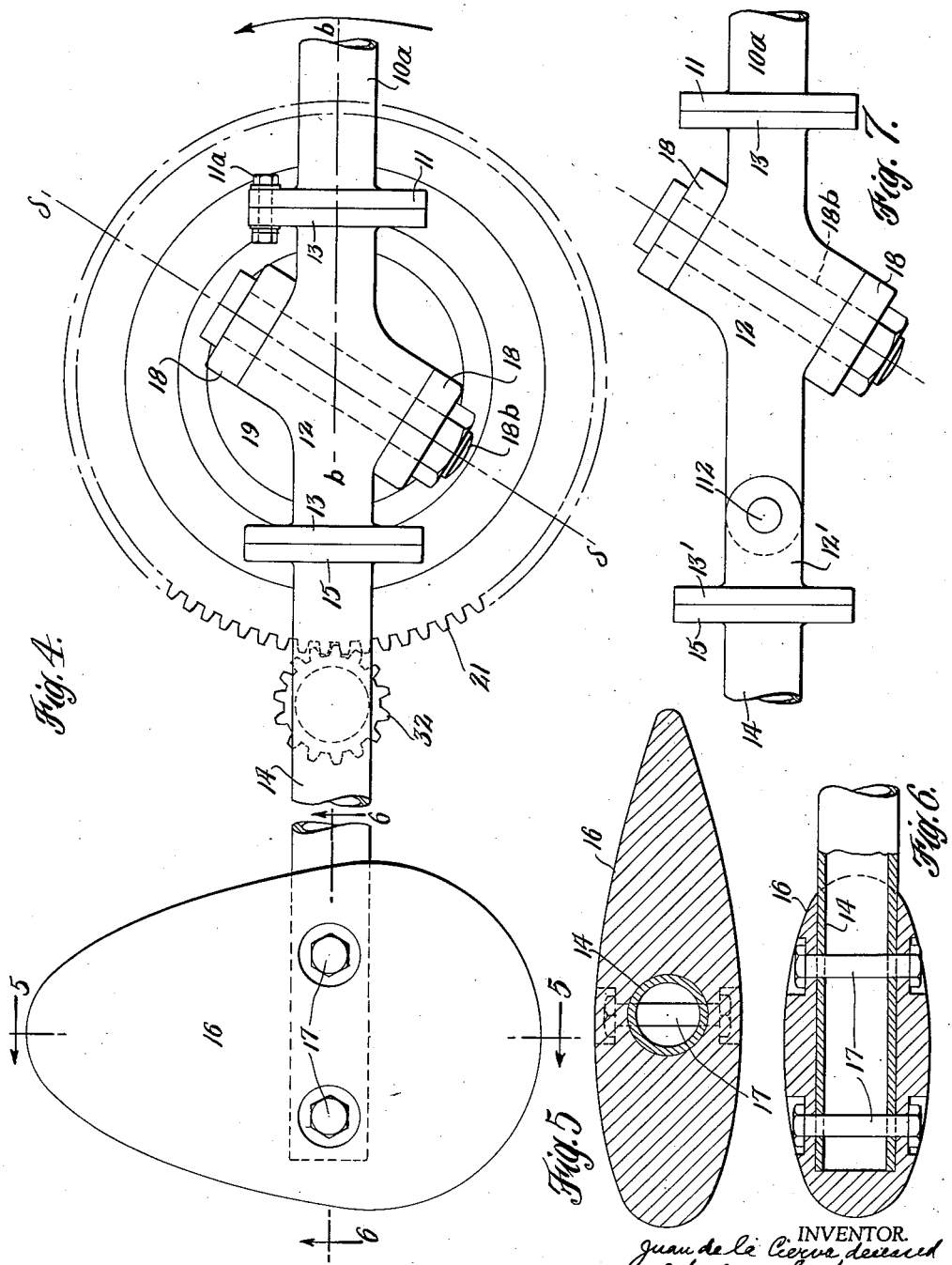

2,242,457

UNITED STATES PATENT OFFICE 2,242,457

AIRCRAFT WITH CONTROLLABLE SUSTAINING ROTORS

Juan de la Cierva, deceased, late of London, England, and Madrid, Spain, by John Josselyn, London, England, and Reginald Blake, Aldwych, London, England, administrators, assignors, by mesne assignments, to Autogiro Company of America, a corporation of Delaware Application October 10, 1938, Serial No. 234,192
In Great Britain November 2, 1937

4 Claims. (Cl. 244—18)

The present invention relates to aircraft with controllable sustaining rotors and more especially to an improved rotor for such aircraft, wherein the rotor turns about a generally upright axis, the thrust line of the rotor being controllable in flight; and while useful in machines having normally power-driven rotors the invention is particularly advantageous in normally autorotated rotors, which latter may, however, have a disconnectible drive from the aircraft power plant or suitable auxiliary power plant.

One of the primary objects of the invention is to minimize vibrations in, and the transmission to the controls of undesirable forces and motions from, a controllable rotor, and at the same time to substantially simplify the rotor construction.

Another object of the invention is to minimize or eliminate the necessity for yielding or resilient restraining devices at the blade pivots. In prior constructions, wherein the rotor comprises a plurality of blades each pivotally mounted by one or more pivots it has been quite customary to provide, in addition to limiting stops, automatic resilient devices and/or damping devices to restrain the movements of the individual blades on their pivots during flight operation and also to cushion the blades during starting and braking of the rotor and when taxiing on the ground. If not carefully adjusted, and maintained in accurate adjustment, such restraining devices are apt to cause undesirable oscillations or vibrations in the rotor and upon the manual control mechanism by which the thrust line of the rotor is controlled. While the present invention in no way precludes the use of such restraining devices if desired, it is designed to render the use of them unnecessary in most cases, or to render their adjustment a less critical matter.

More specifically, it is an object of the invention to minimize or overcome certain jerky motions which were imposed upon the rotor mount, the controls and the machine as a whole in certain machines as heretofore constructed. By way of explanation, in some multi-bladed rotors, as heretofore employed, the blades have been given a large degree of freedom for lag and lead movements in the path of rotation, with the result that either when starting up the rotor or when moving in forward flight, an excessive lag of one blade could coincide with an excessive lead of another blade, with resultant heavy vibrations and undesirable loads on the rotor and its control. The present invention contemplates preserving freedom for substantial lag and lead movements of the blade but at the same time minimizing or eliminating the disadvantage just described.

A further object of the invention is the provision of an improved rotor enabling the use of a lower "solidity," i. e., ratio of blade area to disc area, to be obtained than hitherto usual, and at the same time allowing the structure to be simplified and the overall dimensions of the rotor to be reduced, particularly for purposes of "parking" or storage.

Broadly, the present invention is characterized by the controllable rotor having only one blade, which is suitably counterweighted and pivotally connected to a hub member.

According to a feature of the invention the pivotal connection of the single blade and counterweight to the hub, includes at least one pivot whose axis is generally transverse to the radial axis of the blade and lies approximately perpendicular to the hub axis or slightly inclined to a plane perpendicular to said axis. Such a transverse pivot permits flapping of the blade but is preferably inclined to the radial blade axis in such a way that upward flapping of the blade is accompanied by a decrease of pitch angle of the blade, i. e., the pivot axis makes an acute angle with the radial blade axis on the leading side of the blade. In this manner, change of blade pitch angle is positively inter-related with the arcuate swinging of the blade, and the pitch variation is determined by aerodynamic forces.

If the pivot axis is slightly inclined to the plane perpendicular to the hub axis the inclination is preferably such that the prolongation of the pivot axis lying on the leading side of the blade is inclined upwards with respect to the plane perpendicular to the hub axis.

In one preferred constructional arrangement according to this invention the single blade and its counterweight are rigidly connected to one another and are attached to the hub by means of a single pivot whose axis intersects the rotational axis of the hub at right angles and is inclined to the radial blade axis at an angle of about 60° on the leading side of the blade.

The invention also includes alternative constructions in which the single blade and the counter-weight are independently pivoted to the hub, or to a balance member which is in turn connected to the hub by a single central pivot. To secure various desired operating results, the axes of the several pivots interconnecting the blade, the counterweight and the hub, in such constructions, may be similarly or differentially inclined both to the radial blade axis and to the plane perpendicular to the hub axis and may intersect the hub axis or be offset therefrom. In one such alternative construction the blade and the counterweight are independently pivoted to the hub about parallel axes equally and oppositely spaced from the hub axis and obliquely inclined to the radial axis of the blade so that the latter axis and the blade pivot axis enclose an angle of about 60° on the leading side of the blade, the blade pivot axis being further inclined upwardly on the leading side of the blade with respect to the plane perpendicular to the hub axis so that the projection of the blade pivot axis on the plane containing the hub axis and at right angles to the radial direction of the blade axis makes an angle of about 7½° with the plane perpendicular to the hub axis.

In what follows a sustaining rotor aircraft embodying a single-bladed rotor according to the invention, together with certain modifications, are described, by way of example only, with reference to the accompanying drawings.

In the drawings:

Figure 1 shows in side elevation an aircraft embodying the single-bladed controllable sustaining rotor according to the invention;

Figure 2 is a view of the same in plan;

Figure 3 is a central longitudinal sectional elevation of the rotor head to an enlarged scale;

Figure 4 is a broken partial plan view showing the rotor head and the counterweight;

Figure 5 is a detail view in section taken along the line 5—5 of Figure 4;

Figure 6 is a detail view in section taken along the line 6—6 of Figure 4;

Figure 7 is a fragmentary view similar to Figure 4 illustrating a modification;

Figure 8:
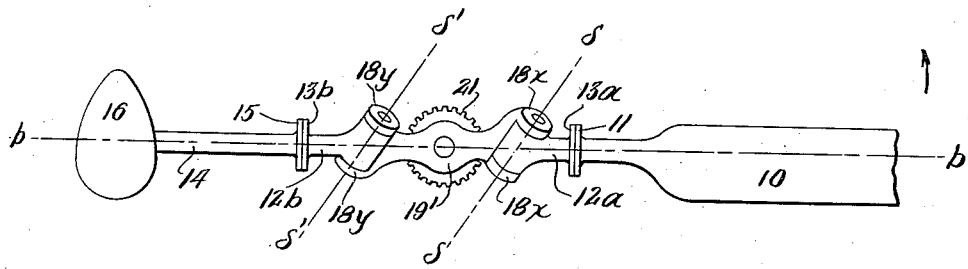
Figure 8 is a somewhat diagrammatic view in plan showing a modified form of rotor head with single blade and counterweight.

In Figures 2, 4, 8 and 10 the direction of rotation of the rotor is indicated by a curved arrow.

Referring to Figures 1 and 2; the aircraft comprises a body B, propulsive engine or motor M driving a tractor airscrew A, a wheeled undercarriage U, tail wheel T, fixed vertical stabilizing surfaces V, fixed horizontal stabilizing surfaces E which may have upturned tips $E_1$, a controllable rudder R, and a rotor supporting pylon P to which is secured a central mast or pylon extension $P_1$ supporting the rotor head generally indicated at H. For driving the rotor for starting purposes there is provided transmission mechanism comprising shafting $S_1$ connected to the engine M and upright shafting $S_2$ having driving connections to the rotor illustrated in Figures 3 and 4, the shafting members $S_1$, $S_2$ being connected by gearing $G_1$ situated in a housing G which also contains a clutch Q for disconnecting the rotor from the engine, the clutch being controlled by a striking fork F and rod N operated by a manual control lever L in the pilot's cockpit. The vertical shafting $S_2$ includes a universal joint J at the top, and at the bottom a second universal joint and associated slip-joint, indicated together at $J_1$. The rotor head H is universally pivoted on the mast $P_1$ as shown in Figure 3 and is controllable by means of a hanging control column C universally pivoted at $C_1$ on the pylon structure P and again universally pivoted at $C_2$ to an extension $C_3$ of the rotor head structure, the connection of which is shown in Figure 3.

Referring now to Figures 3 and 4, the upper part of the mast $P_1$ carries a universal pivot means comprising a trunnion block 24, having pairs of trunnions 25, 26, the trunnions 25 being pivoted in the mast $P_1$ and the trunnions 26 being pivoted in the rotor axis member 23 embracing the mast. The lower part of the axis member 23 takes the form of an apertured plate and is provided with a socket 33 in which is secured the extension $C_3$ for connection to the control column as shown in Figure 1. The member 23 also includes a flange or bracket 27 to which is secured a housing 28 in which the upper end of the upright shafting $S_2$ is supported in bearings, of which one is shown at 29. The shafting $S_2$ terminates upwardly in an extension 30 supported in the housing 28 by a bearing 31 and carrying a pinion 32 engaging a ring gear 21 coaxially supported by a flanged member 20 from the rotor hub 19 which is mounted on the axis member 23 by means of main bearings 22.

The upper part of the hub member 19 is provided with a pair of brackets 19 apertured at 18a to receive flapping pivot 18b on which is articulated a rocking member 12 flanged at each end at 13. A single rotor blade 10 is provided at the inner end of its spar 10a with a flange 11 for attachment, as by bolts 11a (one of which is shown), with one of the flanges 13 of the member 12, the blade being balanced by a counterweight 16 secured, e. g., by bolts 17, to a short arm 14 provided at its inner end with a flange 15 for attachment to the other flange 13 of the member 12, the arm 14 being aligned with and directed oppositely to the blade 10 with respect to the hub viewed in plan.

Though the counterweight is not intended as a lifting element, yet to minimize drag it may advantageously be streamlined in the direction of rotation as shown in Figures 4 and 5, and be of generally oval section in the radial direction as shown in Figure 6.

The axis (indicated by the line $b$—$b$) of the single flapping pivot 18b intersects the rotational axis of the hub at 90°, being therefore contained in a plane perpendicular to the axis of the hub, and is inclined to the axis $b$—$b$ of the blade and counterweight arm at an acute angle on the leading side of the blade, as shown in Figure 4; this acute angle being preferably about 60°.

The principal component of the flapping oscillation (with associated pitch variation) about the axis of the pivot 18b, when in forward flight, has a frequency of once per revolution of the rotor and the blade tip therefore describes a path lying approximately in a plane which is inclined at an angle to the plane perpendicular to the axis of the hub. This angle, which may be called the "flapping" angle, normally has a value of about 5°. Furthermore, the aerodynamic lift on the blade causes it to "cone," i. e., the radial axis of the blade ($b$—$b$ in Figure 4) has a mean inclination above the plane perpendicular to the axis of the hub called the "coning" angle whose value is of the same order as that of the flapping angle.

Since the axis $b$—$b$ of the flapping pivot 18b is perpendicular to the axis of the hub, the motion of the blade thereabout, at least for small values of the flapping and coning angles, takes place approximately in a plane containing the axis of the hub, with respect to which the axis of the path described by the blade tip is inclined by reason of the flapping motion, with the result that the angular velocity of the hub and the angular velocity of the blade about the axis of its true path are subject to periodic variation relatively to one another. When the rotor is operating autorotatively, the hub, by reason of its negligible moment of inertia compared with that of the blade and counterweight, experiences a periodically varying angular velocity, while the blade and counterweight rotate with substantially constant angular velocity about the true axis of their path and no substantial bending moments in the blade and counterweight arm in the path of motion are generated.

There is also, however, a periodic variation of aerodynamic drag force operating approximately in the path of motion and tending to cause periodic variation of the angular velocity of the blade. These forces are experienced by the blade but not by the counterweight and they therefore give rise to periodic bending moments in the rigidly connected blade and counterweight arm. These bending moments and those resulting from second and higher order harmonics of the flapping motion, may be relieved by introducing an additional pivot connecting the counterweight arm to the central rocking member 12, the axis of which pivot is orientated primarily for relative lag and lead between the blade and counterweight, said pivot axis for example being approximately parallel to the axis of rotation of the hub. This modification is illustrated in Figure 7 in which the flange 15 at the root of the counterweight arm 14 is secured to a flange 13' on a forked member 12' pivoted to the rocking member 12 by means of a pin 11² whose axis in the position shown in Figure 7 is parallel to the rotational axis of the hub.

Figure 9:
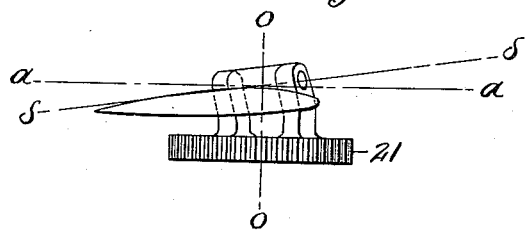
Figure 9 shows somewhat diagrammatically and to a slightly enlarged scale the showing of Figure 8 as viewed in end elevation from the tip of the blade.

Figures 8 and 9 show a modified construction wherein the blade and counterweight are independently pivoted to an extension of the hub member. Figure 8 shows the modified rotor in plan, and the hub member is provided at the top with an integral bracket member 19', terminating laterally in a pair of forks 18x, 18y, which support pivot pins on which the blade and counterweight are mounted. The flanged root 11 of the blade 10 is secured as before to a flange 13a of a root member 12a mounted on the pivot pin carried by the fork 18x and the flanged root 15 of the counterweight arm 14 is secured to a flange 13b of a root member 12b mounted on the pivot pin carried by the fork 18y. The axes of these pivots are denoted respectively by the lines δ—δ and δ'—δ'. In the plan view shown in Figure 8 these axes are inclined similarly to the axis of Figure 4 at an angle of about 60° to the radial axis b—b of the blade and counterweight, the acute angle being on the leading side of the blade as before.

With the object of reducing bending stresses in the blade and counterweight arm, consequent on the flapping and coning movement, the pivot axes δ—δ and δ'—δ' are slightly inclined, as shown, to the plane perpendicular to the rotational axis of the hub. This is more clearly shown in Figure 9, which shows a view in elevation taken from the tip of the blade, from which it will be seen that the axis δ—δ is inclined upwards on the leading side of the blade with respect to the plane a—a perpendicular to the hub axis o—o. When projected on the plane of Figure 9, which is perpendicular to the blade axis b—b of Figure 8, the angle between the projections of δ—δ and a—a is in this example about 7½°. If the flapping axis were oblique in plan only, i. e., at an acute angle to the blade axis b—b, as seen in Figure 8, the blade, when flapping upwardly, would also be moving toward a leading position (viewed in plan); but by introducing the secondary obliquity, i. e., inclining the hinge axis upwardly at the forward side of the blade (as seen in Figure 9) the flapping movement of the blade can be made to occur in a plane substantially containing the rotor axis o—o. In fact, a secondary inclination of 7½°, as here employed, will be sufficient to introduce some lagging movement of the blade upon upward flapping and leading movement upon downward flapping, which is in conformity with the aerodynamic forces acting on the blade when the machine is traveling in forward flight. Thus bending stresses are materially reduced.

Figure 10:
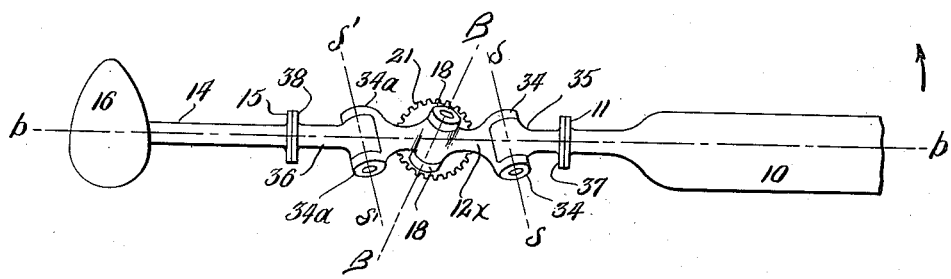
Figure 10 is a view similar to Figure 8 showing a further modification.

A further modification is illustrated in Figure 10 in which the blade and counterweight are independently pivoted to a balance member which is in turn pivoted to the hub. In this instance the balance member 12x is pivoted to the hub about an axis β—β which is inclined as in the previous examples in plan view (as shown in Figure 10) to the radial axis of the blade and counterweight so as to make an acute angle on the leading side of the blade. As before the pivot pin of the pivot β—β is supported in ears 18 integral with the hub, as in Figures 3 and 4.

The balance member 12x terminates laterally in forks 34 and 34a which support pivot pins on which are articulated root members 35 and 36 terminating in flanges 37 and 38 for attachment respectively to the flanged root 11 of the blade 10 and the flanged root 15 of the counterweight arm 14. The axes of the pivot pins carrying the root members 35 and 36 are respectively denominated δ—δ and δ'—δ', and these axes are in this example inclined in the plan view of Figure 10 in the opposite direction to the axis β—β with respect to the blade and counterweight axis b—b. The axes β—β, δ—δ and δ'—δ' are moreover inclined with respect to the plane of the figure, which is perpendicular to the axis of rotation of the hub, and it will be seen by the appearance of the ears 18 and forks 34, 34a that the axis β—β is inclined upwardly with respect to the plane perpendicular to the hub axis on the leading side of the blade as viewed from the tip of the blade, whereas the axes δ—δ and δ'—δ' are inclined in the opposite direction with respect to the plane perpendicular to the hub axis. As in Figure 8, the axes δ—δ and δ'—δ' are parallel to one another, and whereas the inclination of the axis β—β in the direction shown, i. e., making an acute angle with the blade axis on the leading side of the blade, is considered to be of importance, the auxiliary axes δ—δ and δ'—δ' may be inclined in plan in the opposite direction as shown, or alternatively in the same direction but preferably at a slightly different angle, being advantageously more nearly perpendicular to the blade axis b—b in plan view.

As regards the inclination of these axes in end elevation the exact values of the respective inclinations are largely optional, although it is preferable that the projection of the axes δ—δ and δ'—δ' on the plane perpendicular to the axis b—b are not coincident or parallel with the projection of axis β—β and that the axes δ—δ and δ'—δ' are sufficiently inclined in elevation to permit substantial leading and lagging motions of the blade and counterweight.

It is therefore to be understood that the constructions illustrated in Figures 8 to 10 are given by way of example merely, as illustrating alternative constructions within the scope of the invention, and that the pivotal arrangements illustrated in these examples may be widely varied to meet various subsidiary problems requiring solution in particular designs of rotor in accordance with this invention.

By suitable choice of blade section and plan form, and of "solidity," the coning angle of the single blade of the rotor according to this invention may be made such that ample clearance over the propeller and tail surfaces will be secured under all conditions of tilt of the controllable rotor axis, the counterweight presenting no clearance problem, since it traverses a path close to the rotor mounting pylon, its distance from the rotor centre being less than the distance between said centre and the airscrew.

From the foregoing it is thought that without further explanation it will be evident that the objects and advantages set out at the beginning of this specification are secured by the present invention by a construction which is relatively simple and therefore less costly to build and maintain than many of the structures heretofore in use, and notably that the arrangement tends to minimize undesirable motions and forces in the control stick of an aircraft having a controllable rotor wherein the rotor thrust line is shiftable with reference to the centre of gravity of the craft for control purposes.

It is claimed:

1. For an aircraft, a sustaining and controlling rotor comprising a generally upright hub member, a single sustaining blade radially disposed thereon, pivotal means connecting said blade to the hub member and providing at least for oscillation of said blade generally transverse its path of rotation, a substantially non-lifting counterweight counterbalancing said blade, controllable means adapted to alter the path of blade movement to shift the thrust line of the rotor for control purposes, said pivotal means comprising a balance member pivotally connected to the hub about an axis generally transverse to the radial axis of the blade and approximately intersecting the hub axis, and pivot means independently pivoting the blade and counterweight to the balance member about axes oppositely spaced from and non-intersecting with respect to the hub axis and obliquely angled with respect to the axis of the pivot connecting the balance member to the hub.

2. In an aircraft sustaining rotor comprising a hub and blade means, mechanism for connecting the blade means with the hub including a connecting member pivotally mounted on the hub on an axis so angled that when viewed in plan the pivot axis makes an acute angle with the longitudinal axis of a blade at the leading side of the latter and at the outboard side of the pivot axis, and a pivot connecting a blade with said connecting member, the axis of the last pivot, when viewed in plan, making an obtuse angle with the longitudinal axis of the associated blade at the leading side thereof and at the outboard side of the pivot axis.

3. In an aircraft sustaining rotor comprising a hub and blade means, mechanism for connecting the blade means with the hub including a connecting member pivotally mounted on the hub on an axis so angled that when viewed in plan the pivot axis makes an acute angle with the longitudinal axis of a blade at the leading side of the latter and at the outboard side of the pivot axis, and a pivot connecting a blade with said connecting member, the axis of the last pivot being located outboard of the first pivot axis and, when viewed in plan, making an obtuse angle with the longitudinal axis of the associated blade at the leading side thereof and at the outboard side of the pivot axis.

4. In an aircraft sustaining rotor comprising a hub and blade means, mechanism for connecting the blade means with the hub including a connecting member pivotally mounted on the hub on an axis intersecting the hub axis and so angled that when viewed in plan the pivot axis makes an acute angle with the longitudinal axis of a blade at the leading side of the latter and at the outboard side of the pivot axis, and a pivot connecting a blade with said connecting member, the axis of the last pivot being located outboard of the first pivot axis and, when viewed in plan, making an obtuse angle with the longitudinal axis of the associated blade at the leading side thereof and at the outboard side of the pivot axis.

JOHN JOSSELYN.
R. BLAKE.
*Administrators of the Estate of Juan de la Cierva, Deceased.*